R. D. PETERS.
REEL.
APPLICATION FILED APR. 3, 1920.

1,426,597.

Patented Aug. 22, 1922.
2 SHEETS—SHEET 1.

WITNESSES
R. A. Thomas

R. D. Peters  INVENTOR
BY Victor J. Evans
ATTORNEY

R. D. PETERS.
REEL.
APPLICATION FILED APR 3, 1920.

1,426,597.

Patented Aug. 22, 1922.
2 SHEETS—SHEET 2.

R. D. Peters
INVENTOR

BY

ATTORNEY

WITNESSES

UNITED STATES PATENT OFFICE

ROBERT D. PETERS, OF KNOX, INDIANA.

REEL.

1,426,597. Specification of Letters Patent. Patented Aug. 22, 1922.

Application filed April 3, 1920. Serial No. 371,052.

*To all whom it may concern:*

Be it known that I, ROBERT D. PETERS, a citizen of the United States, residing at Knox, in the county of Starke and State of Indiana, have invented new and useful Improvements in Reels, of which the following is a specification.

My present invention has reference to a line drying reel and may be considered in the nature of an improvement on the line drying reel upon which I received United States Letters Patent No. 1,286,085, on November 28, 1918.

In my referred to patent the line drying reel is designed to be employed in connection with the usual casting reel. With my present construction I dispense with the usual casting reel, and provide a combined casting and line drying reel in a unitary structure.

It is also the purpose of the present invention to produce a combined casting and line drying reel in which a perfect casting can be made for a comparatively great distance, and in which the unwinding of the reel is at all time under control of the angler, and also in which the danger of back-lashing is entirely obviated.

It is a further object to produce a combined drying and casting reel which shall be of a comparatively simple construction, and easily operated, and in which the tension may be readily regulated so that the reel will wind or unwind at varying desired speeds.

A further object of the invention is to produce a combined casting and line drying reel in which the turning of the reel, when a casting is made is under control of the thumb of the angler so that the line can be cast at varying predetermined distances and to desired places in the water and also whereby a slight pressure of the angler's thumb will prevent back-lashing.

Other objects and advantages will present themselves as the nature of the invention is more fully understood, reference being had to the accompanying drawings in which there is illustrated a satisfactory reduction of the improvement to practice.

In the drawings:—

Figure 1:
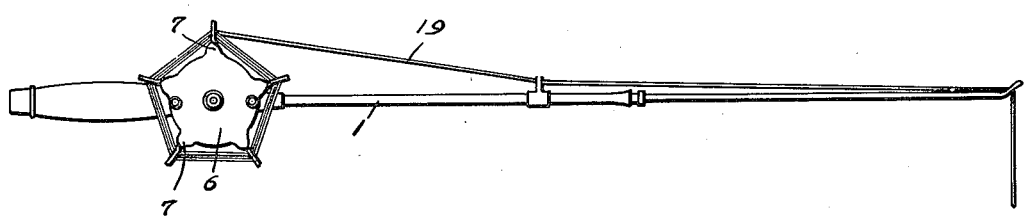
Figure 1 is a view showing my improvement attached to an ordinary fishing pole.
Figure 2:
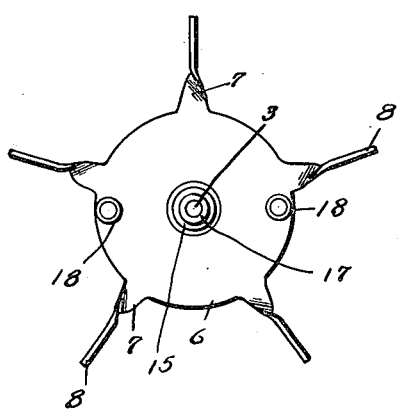
Figure 2 is a front elevation of the improvement on an enlarged scale.
Figure 3:
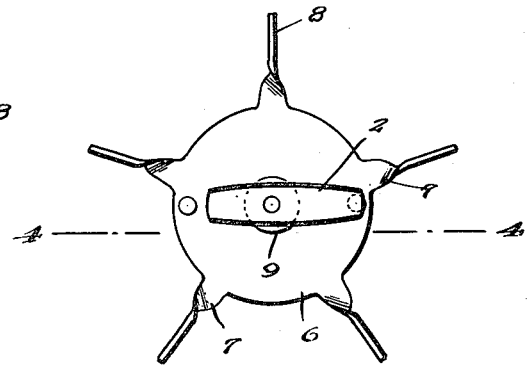
Figure 3 is a rear view thereof.
Figure 4:
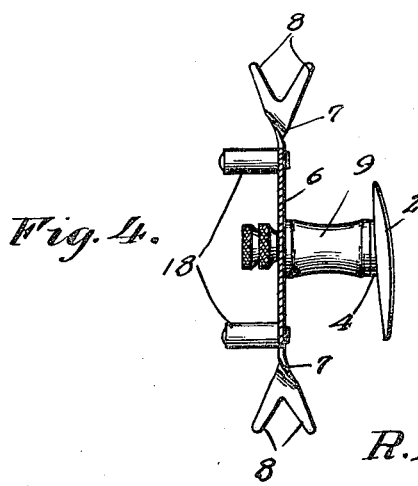
Figure 4 is a sectional view approximately on the line 4—4 of Figure 3.
Figure 5:
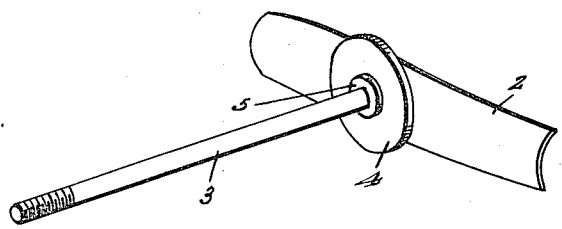
Figure 5 is a perspective view of the base or foot plate of the shaft carried thereby.
Figure 6:
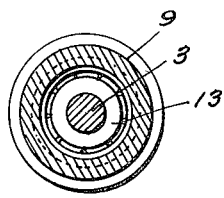
Figure 6 is a perspective view of the reel looking toward the inner face thereof.
Figure 7:
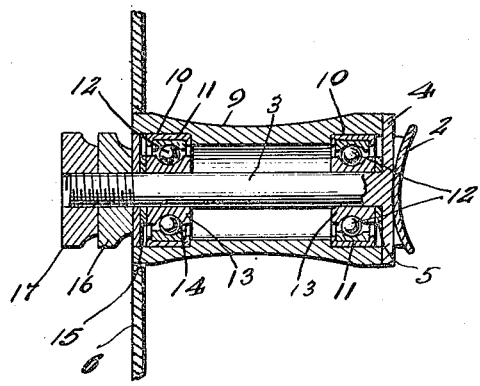
Figure 7 is a greatly enlarged sectional view taken through the hub portion of the reel.

Clamped, in the usual manner to a rod 1, is the base or foot portion 2 of my improved reel. The base or foot plate 2 carries the outstanding shaft 3, and on the shaft, at the juncture thereof with the plate 2 is a disk 4. This disk has at its center an outwardly extending round boss 5. The outer end of the shaft 3 is threaded.

The reel includes a flat peripherally round plate 6 that, at equi-distant points is provided, on its periphery with outstanding arms 7. The arms are of an equal length, and are given a half-twist each at an equal point from the periphery of the reel so that the outer flat portions of the arms are arranged at a right angle with respect to the plane of the body plate or disk 6. The arms, at their outer ends are slotted or otherwise formed to provide oppositely disposed angular fingers 8. The opening or space between the fingers is substantially V-shaped, but the lower wall connecting each pair of fingers is rounded.

Integrally formed on one of the faces of the disk-like body plate 6 is a laterally arranged hub 9. This hub, adjacent to its ends has angular depressed portions 10—10 in which are seated the outer flanged ring member 11 of a raceway for anti-frictional balls 12. The inner members of the raceway are indicated by the numeral 13, and are in the nature of sleeve members having their outer peripheries grooved as at 14 to receive the anti-frictional balls 12 while through the balls thereof the shaft 3 extends.

The outer raceway for the anti-frictional balls is disposed only slightly inward of the outer face of the body plate 6, it being, of course, understood that the body plate has an opening that aligns with the portions 11 of the bore of the hub 9, while the inner raceway is contacted by the hubs 5 on the disk 4. On the threaded end of the shaft I arrange washers 15 that contact with the outer raceway for the anti-frictional elements, and screwed on the said threaded end of the shaft is a nut 16 which contacts with the outer washer 15 and a lock nut 17 that contacts with the nut 16. On the outer face of the body plate 6, at preferably diametrically opposed points are handle members 18. These handles include outer sleeves that are revoluble on pintles or shafts as clearly disclosed by the drawings. The line 19 may be secured to one of the arms 7, and is wound between all of the fingers 8. It will be noted that the hub of the device is disposed at a convenient place on the rod and contacted by the thumb of the fisherman, and consequently by regulating the pressure of this thumb on the said hub the rapidity at which the reel revolves can be readily regulated so that the line can be cast a determined distance and to a determined point by adjusting the pressure of his thumb on the hub. Likewise such pressure will effectively prevent the back-lashing of the line. The reel is comparatively large in size, and the connecting wall between the spaced fingers on the respective arms being spaced a considerable distance from the periphery of the body plate 8 permits of a free circulation of air to the line wound on the reel. From practice I have found that a line wound on a structure as above described will, without any attention dry in less than five minutes, but the throwing of the reel in the air, in the casting operation causes the same to dry in a far less time, so that even if the line is partly wet when the cast is made, it will be comparatively dry before reaching the water. The initial tension between the reel and its shaft is regulated by the adjusting of the nuts 16 and 17.

While the improvement is primarily devised for use by fishermen, it is to be understood that it is not to be thus restricted, as the line on the reel may be employed in kite flying, in the casting of hand grenades or bombs, and the reel upon an enlarged scale may be used for winding the cable attached to a balloon. It is to be understood that while I have illustrated and described the preferred embodiment of the improvement as it now appears to me, I may in the future make changes therefrom, and therefore I am entitled to such departures from the showing and description as fall within the scope of what I claim.

Having thus described the invention, what I claim is:—

A combined line drying and casting reel, comprising in combination an anchor plate, a disk on one side thereof, a shaft projecting laterally from said disk, a second and relatively large disk having radial arms terminating in divergent fingers, a tubular hub projecting centrally from one side of said second disk, said shaft extending through said hub, ball raceways seated in said hub at the ends thereof, cooperating raceways carried on the shaft, and longitudinally slidable thereon, binding means mounted on the shaft and coacting with said longitudinally slidable raceways, and locking means for said raceway coacting means, also mounted on said shaft.

In testimony whereof I affix my signature.

ROBERT D. PETERS.